United States Patent Office 3,109,413
Patented Nov. 5, 1963

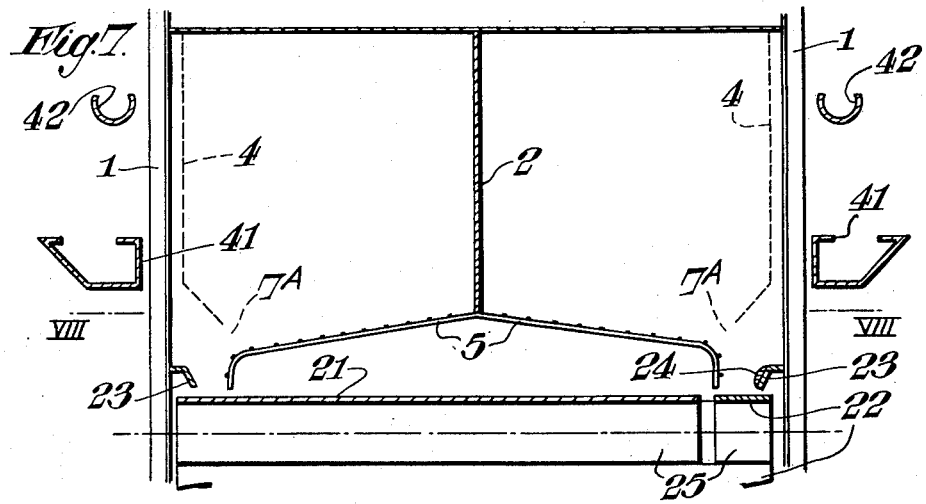
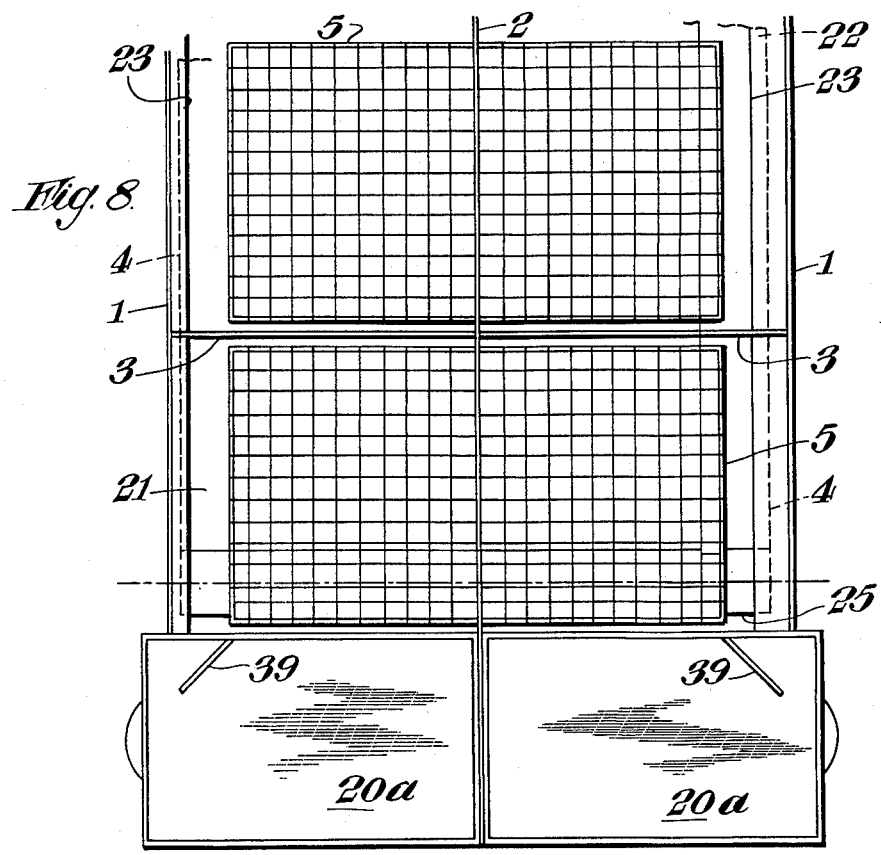

3,109,413
LONGITUDINALLY TRAVERSING EGG-COLLECTING MECHANISM FOR LAYING CAGES
Eric Patchett, Springfield Clayton Heights, Queensbury, Bradford, England
Filed Nov. 22, 1960, Ser. No. 70,949
2 Claims. (Cl. 119—48)

The invention relates to poultry batteries, laying cages and similar appliances and has as one object the provision of means for automatically collecting eggs laid by the occupants of the appliances.

Another object is to ensure scrupulously clean and hygienic conditions for the occupants of the appliances by providing means for automatically and periodically clearing away droppings and foreign matter by employing a traversing preferably power-driven endless belt system beneath the floors of the cages of the appliances. In conjunction with the belt system there are provided scrapers and certain of the latter may be installed in a manner whereby in the case of multi-tiered batteries or appliances, the foreign matter is deposited at one end only.

A still further object of the invention is the provision of means for automatically washing and mechanically brushing the aforesaid endless belt and for drying the same during its traversing operation.

In addition to the heretofore-described objects other objects of possibly less importance have been achieved to provide poultry batteries, laying cages and similar appliances with cages or compartments of simplified yet efficient construction and for facilitating feeding and watering of the occupants, and the manner of achieving the said objects will be elucidated in the ensuing description.

According to the invention the poultry cage or like appliance has means associated with the inclined floors of the compartments for receiving eggs rolling down the floors, the said means being adapted to be traversed relative to the said floors for conveying eggs deposited on the said means to the end or ends of the appliance. The means for receiving the eggs may comprise a flexible belt or bands adapted to be driven to and fro the length of the appliance, they may include a moving carriage adapted to push eggs through apertures in the floors on to a tray or receptacle, or they may include a moving carriage arranged to automatically open pivoted flaps on the floors for releasing eggs on to a tray or the like of the carriage.

Means may also be combined with the appliance for automatically clearing away droppings and foreign matter, the said means consisting of an endless belt or belts, adapted to be traversed beneath the cage floors, and scrapers and if desired, the belts may be washed and scrubbed by passage through a conveniently located bath.

Other features of the invention will be introduced to the ensuing decription at a latter stage.

In order that the invention may be fully and clearly comprehended, the same will now be described with reference to the accompanying drawings, in which:

FIGURE 7 is a diagrammatic sectional end view of a fragmental part of a poultry battery constructed according to a further modification of the invention.

FIGURE 8 is a sectional plan of FIGURE 7 on the line VIII—VIII thereof.

Figure 1:
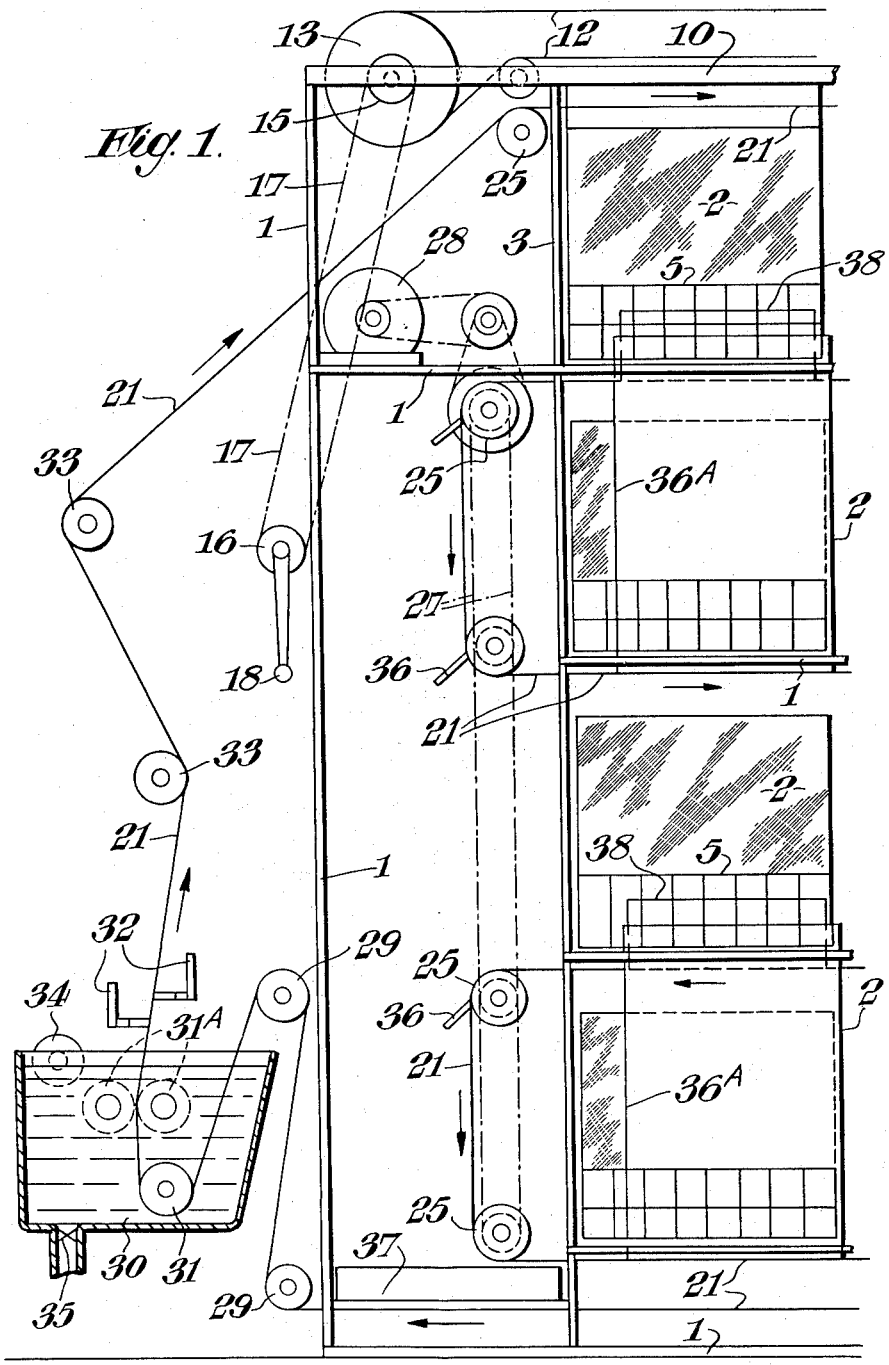
FIGURE 1 is a diagrammatic side view of one end of a four-tier double-sided poultry battery constructed according to one embodiment of the invention.

The poultry battery frame 1 is of substantially orthodox construction employing longitudinal and transverse horizontal members, vertical members and suitable bracing members to achieve the desired shape and size of appliance preferably incorporating a number of superposed tiers of cages arranged in horizontal rows. The cages may be back-to-back so as to be double-sided and free-standing, as shown in the drawings.

Figure 2:
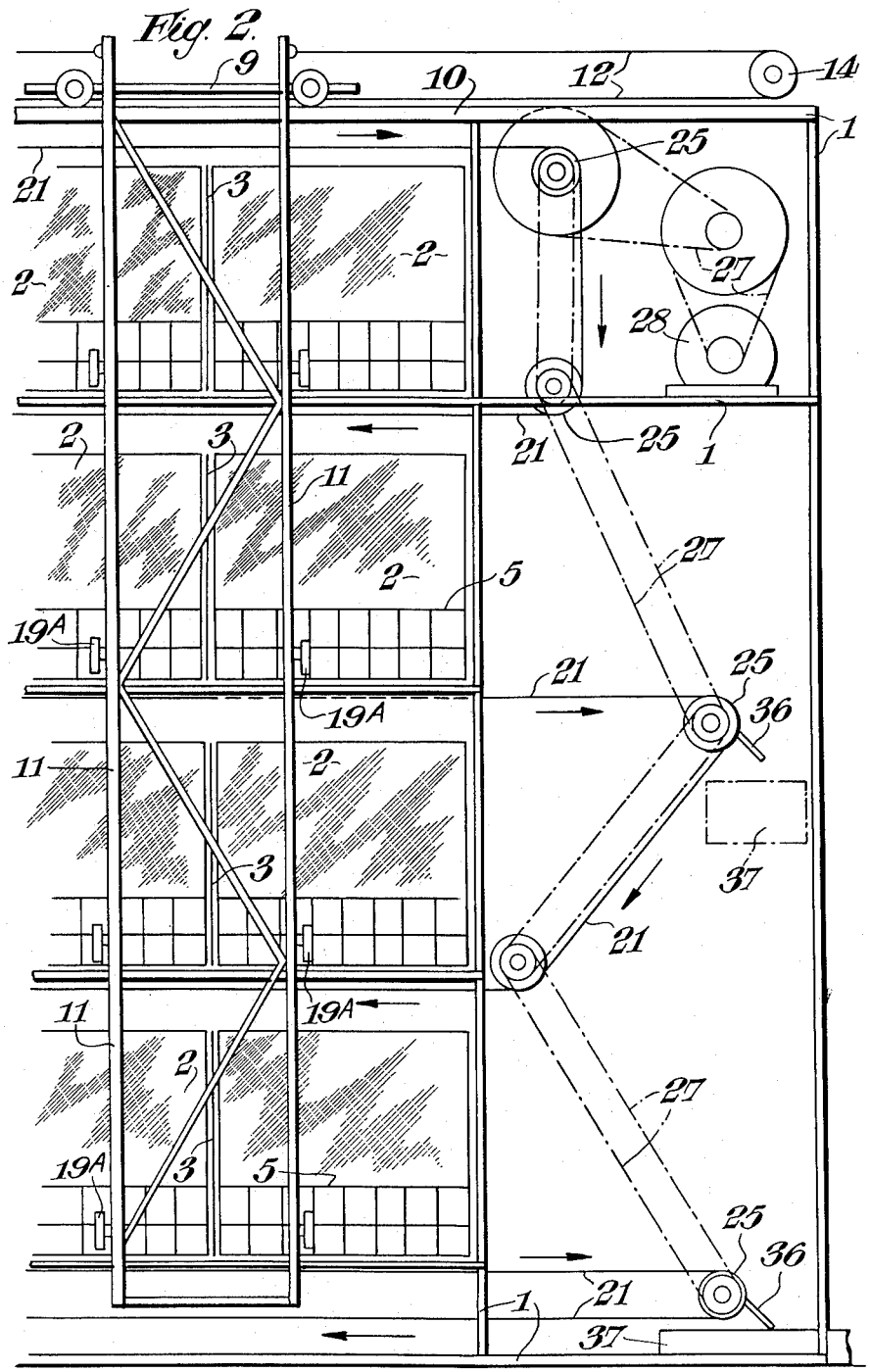
FIGURE 2 is a similar view to FIGURE 1 of the opposite end of the battery.

Each cage is provided with a back side 2, sides 3 and a wire mesh side 4. In FIGURES 1 and 2 the mesh sides opposite back 2 have been omitted from the cages for the sake of clarity.

Each cage is also furnished with a wire mesh floor 5 adapted to slope or to be inclined downwardly from back to front and for the front edge to project beyond the outside of the cage.

In the example of the invention illustrated at FIGURES 3 to 6, the front of the said floor 5 has a wire mesh or similar flap 6 pivoted at 7 thereto which flap normally closes an opening 7A between the floor and the bottom of the cage front.

Figure 4:
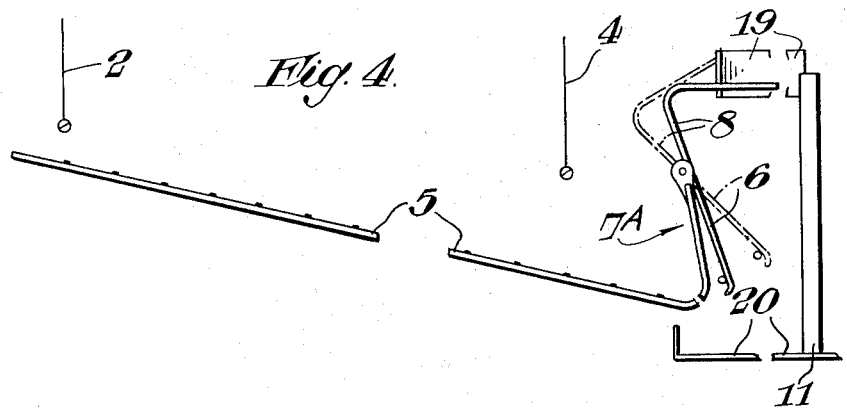
FIGURE 4 is an enlarged detailed end view of a single cage floor of the battery illustrated in the previous figures, showing a method of actuating the automatic egg-collecting means.
Figure 5:
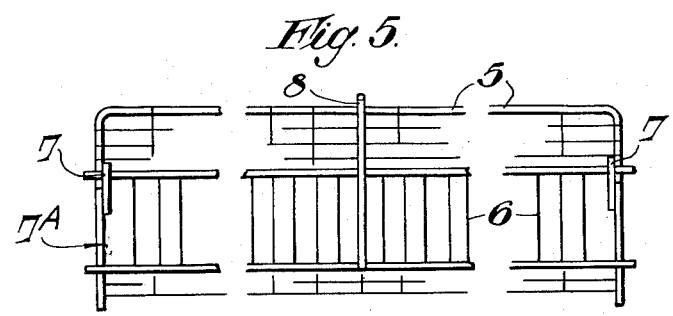
FIGURE 5 is a fragmental front view of a cage floor according to the invention.
Figure 6:
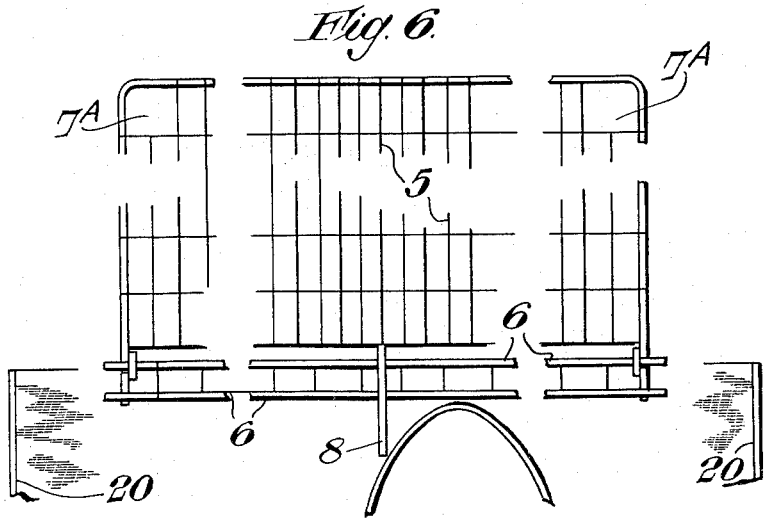
FIGURE 6 is another modification which is shown in plan view and is related to FIGURE 5 and this view illustrates a fragmental portion of operating means for egg collection.

Midway of the pivoted flap 6 there is secured thereto or formed integral therewith an upwardly projecting cranked arm 8 so that when the arm is pressed back—see broken lines in FIGURE 4—the pivoted flap 6 opens at an angle to the cage bottom sufficiently for an egg or eggs upon the floor to roll off the front of the floor.

Figure 3:
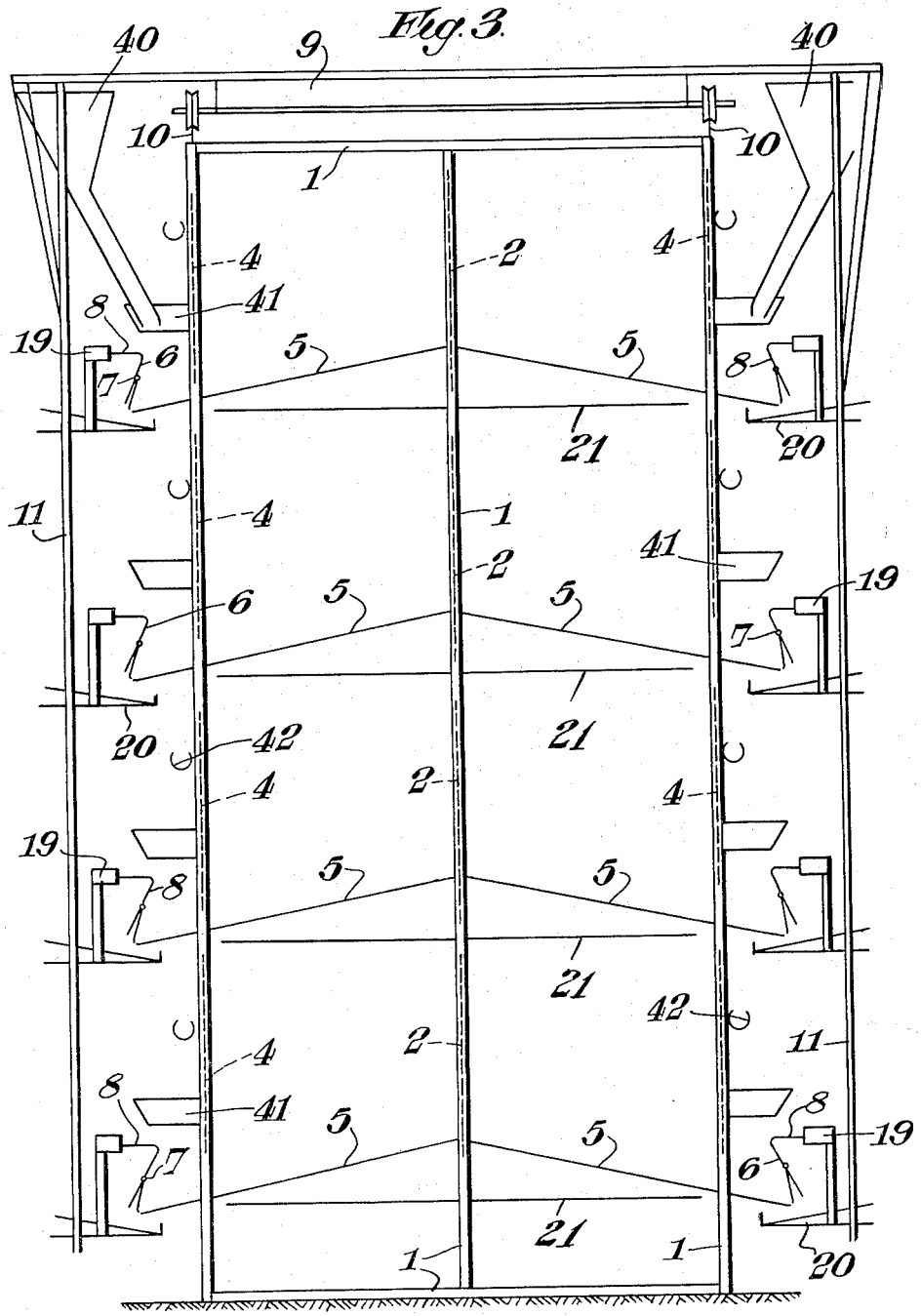
FIGURE 3 is an end view of FIGURE 2, certain parts illustrated in the latter figure being omitted to avoid confusion.

A convenient manner of automatically actuating the flaps 6 is to provide a wheeled carriage 9 mounted upon a track formed by a pair of parallely spaced rails 10 on the top of the frame 1, see FIGURES 1 to 3. The said carriage 9 straddles the appliance in the case of a double-sided battery to provide a pair of dependent or perpendicular frames 11 of approximately similar length to that of the height of the appliance.

The wheeled carriage is connected to a cable 12 arranged to pass over pulleys 13 and 14 at each end of the appliance the shaft for pulley 13 carrying a sprocket 15 which is interconnected with a further sprocket 16 by an endless chain 17. A crank or handle 18 is associated with the sprocket 16 whereby manual operation of the said handle actuates the chain and sprocket mechanism and consequently the cable 12 to cause the carriage to traverse the rails in a direction corresponding to the direction of rotation of the handle 18.

Alternatively, a conventional electromotor or other suitable power unit could be substituted for the handle 18.

Secured to the dependent frames 11 of the carriage are cams 19 corresponding in number on each frame to the number of tiers of cages, the cams being arranged in alignment with the respective horizontal rows or cranked arms 8 of the aforesaid pivoted flaps 6.

When the eggs are laid by the occupants of the appliance they roll down the inclined floors of the cages to engage the pivoted flaps 6 which occupy closed positions. In such positions the eggs are out of reach of the birds.

To collect the eggs, the wheeled carriage is caused to longitudinally traverse the length of the appliance by operation of the cable 12 as already described during which traverse the aforesaid cams 19 progressively engage the cranked arms 8 of the pivoted flaps 6 to press the flaps backwardly. This action causes the flaps to automatically open and the eggs then roll through openings 7A on to detachable trays or receptacles 20 mounted upon the carriage.

When the carriage reaches the end of its traverse in one direction all the eggs have been collected and may be disposed of as desired. The carriage is subsequently traversed in an opposite direction for the next egg collecting operation.

Immediately the cams 19 disengage from the cranked arms of the flaps, the latter automatically close to retain subsequently laid eggs. The closing action of the flaps is due to gravity or may be assisted by conventional weights or springs.

The heretofore described means for automatically collecting eggs has proved very satisfactory in practice and deals kindly with the eggs so that breakages of the latter are rare.

It must, however, be understood that other means for automatically collecting eggs may be employed. For instance the aforesaid pivoted flap 6 may be dispensed with and the projecting part of each cage floor furnished with two openings—one near each end (7A, FIGURE 6), of a size to permit passage of an egg.

Secured to the dependent frames 11 of the carriage 9 are a number of adjustable arms 19A each provided with a resilient cushion located so as to register with the front bottom portion of the horizontal rows of cages.

When the operating handle 18 is rotated, the carriage 9 is caused to traverse the length of the appliance in one or other direction. The resilient members on the arms 19 progressively engage any eggs which have been rolled to the front of the various floors 5, gently pushing or sliding the eggs along until openings (7A, FIGURE 6) in the floors are reached, whereupon the eggs gravitate through the before-mentioned openings on to trays or receptacles 20 on the carriage.

The trays 20 may be detachably secured to the carriage.

Still further means may be employed for automatically collecting the eggs in lieu of the two previously described arrangements, wherein each cage floor 5 is made to terminate short of the front and is downwardly bent or cranked as shown in FIGURE 7 of the drawings. The lower edge of the cranked part of the floor terminates in close proximity to an endless belt 21 or 22 which will be hereinafter fully described. At a predetermined distance in front of the cranked part of the floor there is arranged a downwardly cranked longitudinal member or guide 23 whose lower end also lies close to the belt 21 or 22.

In this manner a parallel-sided trough is formed whose base is constituted by the one or other of the said belts 21, 22. Thus, eggs laid upon the floors 5 gravitate down the latter and roll into the trough so as to rest upon either belt 21 or the belt 22, out of reach of the birds. If desired the members may carry resilient cushions 24 for safeguarding eggs engaging the same.

The belts 21 and 22 are composed of suitable flexible material such as plastic-covered fabric, plastic film or rubber, and are adapted to traverse the appliance for conveying eggs thereon to one or the other end of the appliance.

In the example of the invention shown in FIGURES 7 and 8 the belt 21 is primarily intended for receiving droppings and foreign matter from the cages. The endless belt or band 21 (see FIGURES 1 and 2) is associated with transverse rollers 25 mounted upon shafts and is arranged to longitudinally traverse the appliance in a manner whereby a belt span is located beneath each tier of cages.

Suitable sprockets 26 and chains 27 are provided for driving the rollers 25, electromotors 28 being provided for supplying driving power.

The belt 21 (and, if desired belt 22) is or are furthermore caused to pass over guide rollers 29 to a water bath 30 where the belt or belts pass under a roller 31, and between a pair of rotary cylindrical brushes 31A which scrub the passing belt. The latter then continues between squeegees 32 and away over further guide rollers 33. 34 is a ball-float valve for controlling flow of water to the bath 30, and 35 is a drain cock.

36 are transverse spring-biased scrapers engaging the belt 21 at various parts and 37 are receptacles for receiving matter scraped off the belt.

Should it be desired that foreign matter on the belt 21 be removed at one end, scrapers 38 may be arranged at an angle across certain spans of the belt which deflect the foreign matter, on the said spans, to a vertical chute 36A for the matter to deposit upon the belt span below.

In the FIGURES 7 and 8 example of the invention separate belt 22 illustrated in combination with the rollers 25, for receiving or collecting and conveying eggs has members 39 for deflecting eggs on the belt to a drawer or tray 20a. Or the eggs could pass to a further conveyor belt or any other suitable means for subsequent disposal.

When the belts 21 and/or 22 are caused to be periodically driven, droppings and foreign matter are automatically cleaned from the belt 21 the belts washed and scrubbed in the bath and the eggs conveyed to a desired station.

In the FIGURES 1-3 example of the invention, the belt 21 merely serves to convey droppings and foreign matter and although it is shown and has been described as power-driven, it may, if the appliance is not too big, be hand-operated.

Where wheeled carriages 9 are employed the latter may be adapted to carry food troughs. Alternatively, the carriages may incorporate food hoppers 40—one for each row of cages, each hopper having a chute or nozzle for supplying food to a corresponding trough 41 extending the length of the appliance. Only the two top hoppers are shown in FIGURE 3 and are omitted from the other figures.

The elements indicated as 42 are water or drinking troughs.

I claim:

1. In a poultry battery of laying cages each having compartments, inclined foraminous floors in said compartments to direct eggs by gravity towards an external cage aperture leading to the outside of the cage at the floor thereof, that improvement comprising a longitudinally reciprocating frame mounted at the sides of the battery opposite side aperture of each cage, an egg receiving tray on said frame located adjacent and below said aperture to receive an egg discharged thereon through said aperture, a carriage mechanism at the top of said battery including means for longitudinal movement, rails under said carriage, said frame being supported by said carriage, and an egg discharging mechanism at the external discharge aperture of each cage comprising a crank, a pivoted lever constituting a closure flap for the aperture, a cam on said frame engaging said lever for moving said flap between a closed position and an open position at said aperture, said flap being weighted to be normally in closed position when not operated by said cam and being opened by tilting movement of said cam due to movement of said frame.

2. A poultry battery as claimed in claim 1 including an excrement removing belt mounted for longitudinal horizontal movement below the bottoms of the cages including means for cleaning the belts.

References Cited in the file of this patent
UNITED STATES PATENTS

| | | |
|---|---|---|
| 2,257,734 | Cornell | Oct. 7, 1941 |
| 2,314,344 | Cornell | Mar. 23, 1943 |
| 2,536,621 | Arnold | Jan. 2, 1951 |
| 2,589,228 | Cordis | Mar. 18, 1952 |
| 2,595,392 | La Lancette | May 6, 1952 |
| 2,966,884 | Naraghi | Jan. 3, 1961 |
| 2,973,742 | Kaegebein | Mar. 7, 1961 |
| 2,987,038 | Cole | June 6, 1961 |
| 3,002,494 | Murray | Oct. 3, 1961 |